United States Patent [19]

Petke et al.

[11] Patent Number: 4,554,303
[45] Date of Patent: Nov. 19, 1985

[54] COPOLYESTER COMPOSITIONS

[75] Inventors: Frederick D. Petke, Kingsport; Charles W. Ramsey, Blountville; Richard L. McConnell, Kingsport, all of Tenn.

[73] Assignee: Eastman Kodak Company, Rochester, N.Y.

[21] Appl. No.: 681,452

[22] Filed: Dec. 14, 1984

[51] Int. Cl.$^4$ .................. C08L 91/06; C08L 91/08
[52] U.S. Cl. ...................... 524/277; 524/487; 524/488; 524/489; 528/295.3; 528/302; 528/308.1; 528/308.7
[58] Field of Search ............... 524/277, 487, 488, 489; 528/295.3, 302, 308.1, 308.7

[56] References Cited

U.S. PATENT DOCUMENTS

| | | | |
|---|---|---|---|
| 3,756,981 | 9/1973 | Breitschaft | 524/277 |
| 4,223,113 | 9/1980 | Bier et al. | 525/439 |
| 4,223,125 | 9/1980 | Bier et al. | 528/305 |
| 4,313,903 | 2/1982 | Bier | 204/328.1 |
| 4,315,882 | 2/1982 | Hiratsuka et al. | 524/277 X |
| 4,368,283 | 1/1983 | Kishida et al. | 524/487 X |

Primary Examiner—Lucille M. Phynes
Attorney, Agent, or Firm—John F. Stevens; William P. Heath, Jr.

[57] ABSTRACT

Disclosed are blends of low-melting, slowly crystallizing copolyesters or of substantially amorphous copolyesters having relatively high glass transition temperatures containing very small amounts of low-molecular-weight polyolefins. These blends have sharply increased crystallinity and crystallization rates and provide significant improvements in production because of the enhanced crystallization.

9 Claims, No Drawings

COPOLYESTER COMPOSITIONS

DESCRIPTION

1. Technical Field

This invention relates to blends of low-melting, slowly crystallizing copolyesters or of substantially amorphous copolyesters having relatively high glass transition temperatures containing very small amounts (0.02-2 wt %) of low-molecular-weight polyolefins. These blends have sharply increased crystallinity and crystallization rates and provide significant improvements in production because of the enhanced crystallization. The compositions have the same good properties as adhesives, heatseal layers, and film resins as their unmodified controls.

2. Background of the Invention

Certain copolyesters are only crystallizable to a low level and crystallize slowly on cooling from the melt or on heating above their glass transition temperatures from the glassy state. Typically these copolyesters are difficult to handle during processing because they soften at relatively low temperatures and particles of them stick together when they are heated. For example, when pellets of low-melting or relatively noncrystalline polyesters or copolyesters are heated to dry them prior to processing, the pellets may stick together. It is often advantageous to crystallize such copolyesters prior to drying or processing them. Once crystallized, the copolyesters may be dried at higher temperatures and may be extruded with less difficulty in conventional extrusion equipment. For example, poly(ethylene terephthalate) (PET) can be extruded much more readily if the polymer is crystallized before feeding to the extruder.

Copolyesters based on poly(ethylene terephthalate) are usually softer, lower-melting, less crystalline materials then the unmodified polymer. They are prone to stick together when they are heated for drying. Some of these copolyesters may be crystallized in hot or boiling water to render them nonblocking during subsequent processing or drying operations. An example is a copolyester of PET modified with 37 mole % of diethylene glycol. This copolyester must be dried very carefully and at low temperature to prevent sticking, and the product is only marginally dried. Crystallization requires significant time in contact with hot water and requires additional expenditure of energy to heat the water and then remove the absorbed water from the product. A process to shorten the time needed for the product to be crystallized would improve the process for making the product.

Several patents exist in which blends of certain polyester plastics and selected polyolefin plastics are claimed. These compositions are generally claimed to be useful for providing molding compositions with improved heat resistance, impact strength, mold release, slip, or electrical properties. The following patents are cited: U.S. Pat. Nos. 4,369,280; 4,290,937; 4,122,061; 3,361,848; 3,579,609; 3,719,729; 4,327,198; and 4,217,426.

We are unaware of any prior art which deals with the use of low-molecular-weight olefin polymers or copolymers as additives which improve the crystallization rate or degree of crystallinity of low-melting or normally amorphous polyester compositions used as adhesives, coatings, coextruded films, and the like.

DISCLOSURE OF THE INVENTION

It has been found that inclusion of a small amount of selected additive polymers to certain slightly crystalline, slowly crystallizing copolyesters increases the crystallization rate of the copolymers sufficiently to shorten the time needed to crystallize the copolyesters for subsequent drying. Also, a low-level of crystallinity may be induced in copolyesters which are normally considered to be amorphous under most conditions. The invention involves blending with the copolyesters small amounts of other types of polymers, such as low-molecular-weight polyethylenes or low-molecular-weight polypropylenes, which enhance the crystallization rate of the copolyesters. Although the exact mechanism is not known, these additives may work by lubricating the copolyester chains sufficiently that they are able to rearrange themselves into a crystalline lattice.

The copolyesters which may be desirably affected by the additives are copolyesters which are amorphous or crystalline to some small extent in the unmodified state but which crystallize slowly in that state. For a polyester such as poly(tetramethylene terephthalate), which crystallizes relatively quickly from the melt, no effect is observed when the additive is present.

Copolyesters which may be useful in this invention are materials which have melting points between about 80° and about 190° C., heats of fusion ($\Delta H_f$) of less than about 6 cal/g, and glass transition temperatures from about $-20°$ C. to about 60° C. The copolyesters used in this invention generally crystallize slowly from the melt so that they are not highly crystalline when cooled and, if they are below their glass transition temperatures, they crystallize no further on standing or storage. Also operable are amorphous copolyesters with Tg values generally in the range of about 30° to about 90° C. which generally do not crystallize during most processing conditions.

The additives which are useful in this invention are low-viscosity (about 5 cP to about 30,000 cP at 190° C.) polyolefins, such as polypropylene and low, medium, and high-density polyethylene. These polyolefins may also be modified by oxidation, maleation, or grafting with other monomers, and the like. Similarly, various waxes, such as paraffin, microcrystalline, and Fisher-Tropsch waxes, are operable. The additives in the present invention are useful in very small quantities, i.e., less than 2 wt % concentration. As little as 0.02 wt % of low-molecular-weight polyethylene has been shown to be effective in significantly increasing the crystallization rate of certain copolyesters. Increasing the additive concentration above 0.02 wt % may also increase the degree of crystallinity in the product after a given heat treatment, but larger concentrations (i.e., greater than 2 wt %) are not generally necessary in the practice of this invention.

According to the present invention, there is provided a composition comprising (a) a copolyester derived from 100 mole % of a dibasic acid component comprising about 40-100 mol % terephthalic acid and 100 mol % of a glycol component comprising about 40-100 mol % ethylene glycol, 1,4-butanediol or 1,6-hexanediol (sometimes referred to herein as principal glycols), wherein about 20-120 mole %, based on 200 mol % polymer, is derived from about (1) 0-about 60 mol % of a second acid selected from the group consisting of isophthalic acid, dimer acid and aliphatic dicarboxylic acids having 3–12 carbon atoms, (2) 0–about 60 mol % of a second glycol having 2–10 carbon atoms, or (3) about 20–120 mol % of a combination of said second acid and second glycol, the copolyester characterized by having a melting temperature of about 80°–190° C. and a $\Delta H_f$ of less than about 6 cal/g, and (b) about 0.02 to about 2%, based on the weight of the copolyester, of at least one natural or synthetic wax with the natural wax being animal, vegetable, or mineral waxes with melting points in the range of about 40° to about 90° C. and melt viscosities in the range of about 5 to about 100 cp at 125° C., the synthetic waxes being based on polyethylene, polypropylene, poly-1-butene, or ethylene or propylene copolymer with each other or with α-olefins containing 3–6 carbons or Fischer-Tropsch waxes Useful second acids include isophthalic acid (IPA), dimer acid (DA), and aliphatic dicarboxylic acids such as adipic (AA), glutaric (GA), and sebacic acid (SA) and the like.

Useful second glycols (different from the glycol used as the primary glycol) include ethylene glycol (EG), propylene glycol (PG), 1,4-butanediol (BD), neopentyl glycol (NP), 1,6-hexanediol (HD), diethylene glycol (DEG), 1,4-cyclohexanedimethanol (CHDM), etc. It should be understood that the second glycol can also be ethylene glycol, 1,4-butanediol or 1,6-hexanediol, but that it must be different from the primary glycol. For example, the following combination of glycols are especially useful:

| Principal Glycol | Secondary Glycol |
| --- | --- |
| ethylene glycol | 1,4-butanediol |
| 1,4-butanediol | 1,6-hexanediol |
| ethylene glycol | 1,6-hexanediol |
| 1,6-hexanediol | 1,4-butanediol |
| ethylene glycol | 1,4-cyclohexanedimethanol |
| any of the above | diethylene glycol |

Especially preferred copolyesters include the following combinations of acids and glycols wherein the dibasic acid component is 40–100 mol % terephthalic acid and the glycol component is 40–100 mol % ethylene glycol, 1,4-butanediol or 1,6-hexanediol:

| I. | TPA | II. | TPA |
| --- | --- | --- | --- |
|  | AA |  | IPA |
|  | EG |  | BD |
|  | DEG |  | HD |
| III. | TPA | IV. | TPA |
|  | GA |  | IPA |
|  | BD |  | HD |
|  | DEG |  | BD |
| V. | TPA | VI. | TPA |
|  | EG |  | IPA |
|  | CHDM |  | BD |

The wax component of the compositions according to this invention may be either natural or synthetic. Suitable natural waxes include the following:

| Waxes | Melting Point | Flash Point | Specific Gravity 25° C. | Acid Number | Ester Number | Saponification Number | Iodine Number | Source |
| --- | --- | --- | --- | --- | --- | --- | --- | --- |
| Bayberry | 108–118° F. 42–48° C. | 470–490 | 0.972–0.982 | 5–24 | 205–215 | 210–239 | 2–10 | Berry |
| Beeswax | 143.6–149° F. 62–65° C. | 468–482 | 0.950–0.960 | 17–24 | 72–79 | 89–103 | 8–11 | Insect |
| Candelilla | 155–162° F. 68.5–72.5° C. | 465° F. Min. | 0.982–0.993 | 12–22 | 31–43 | 43–65 | 19–44 | Shrub |
| Caranauba | 180–187° F. 82.5–86° C. | 570° F. Min. | 0.996–0.998 | 2–10 | 76–78 | 78–88 | 7–14 | Palm |
| Ceresine | 128–185° F. 53.3–85° C. | 400–500 | 0.880–0.935 | Nil | Nil | 2 Max | Nil | Petroleum |
| Japan | 122–133° F. 50–56° C. | 385–400 | 0.975–0.984 | 6–30 | 210–225 | 216–255 | 4–15 | Berry |
| Micro-crystalline | 140–200° F. 60–93° C. | 500–580 | 0.915–0.935 | Nil | Nil | Nil | Nil | Petroleum |
| Montan - German | 83–89° C. | 560–565 | 1020–1030 | 31–38 | 56–66 | 87–104 | 14–18 | Lignite |
| American | 85–88° C. |  | 1020–1030 | 40–55 | 55–70 | 95–125 | 14–18 |  |
| Ouricury | 180–184° F. 82.5–84° C. | 530° F. Min. | 0.970–1.050 | 8–18 | 72–87 | 80–105 | 6–8 | Palm |
| Oxidized Micro-Crystalline | 180–200° F. 82.5–93° C. | 500–600° F. | 0.915–0.935 | 15–50 | 12–40 | 27–90 | Nil | Petroleum |
| Ozokerite | 145–185° F. 57.2–87.8° C. | 500–580 | 0.950–0.960 | Nil | Nil | Nil | Nil | Petroleum |
| Paraffines | 125–165° F. 52–74° C. | 400–470 | 0.880–0.920 | Nil | Nil | Nil | Nil | Petroleum |
| Rice Bran | 169–180° F. 76–82° C. | 520° F. Min. | 0.990–0.998 | 1–10 | 74–110 | 75–120 | 10 Max. | Seed |
| Spermaceti | 107.6–122° F. 42–50° C. | 470–480 | 0.940–0.946 | 0.0–0.5 | 116–125 | 116–125.5 | 3 Max. | Animal |

Synthetic waxes may be used as is or oxidized to provide acid numbers of about 0–50, or grafted with unsaturated monomers such as maleic anhydride, acrylic acid, methacrylic acid or the like to provide modified waxes with saponification numbers of about 0–100. Suitable synthetic waxes include the following:

| Waxes | Description |
| --- | --- |
| Epolene ® E-10 emulsifiable wax | polyethylene |
| Epolene ® E-11 emulsifiable wax | polyethylene |
| Epolene ® E-12 emulsifiable wax | polyethylene |
| Epolene ® E-14 emulsifiable | polyethylene |

-continued

| Waxes | Description |
|---|---|
| Epolene ® E-15 emulsifiable wax | polyethylene |
| Epolene ® E-43 emulsifiable wax | polypropylene |
| Epolene ® N-11 nonemulsifiable wax | polyethylene |
| Epolene ® N-14 nonemulsifiable wax | polyethylene |
| Epolene ® N-34 nonemulsifiable wax | polyethylene |
| Epolene ® N-12 nonemulsifiable wax | polyethylene |
| Epolene ® N-15 nonemulsifiable wax | polypropylene |
| Epolene ® C-10 nonemulsifiable wax | polyethylene |
| Epolene ® C-15 nonemulsifiable wax | polyethylene |
| Epolene ® C-13 nonemulsifiable wax | polyethylene |
| Epolene ® C-16 nonemulsifiable wax | polyethylene |
| Epolene ® C-18 nonemulsifiable wax | polyethylene |

The foregoing waxes are described as follows:

|  | E-10 | E-11 | E-12 | E-14 | E-15 | E-43 |
|---|---|---|---|---|---|---|
| Density at 25° C. | 0.942 | 0.941 | 0.955 | 0.939 | 0.925 | 0.934 |
| Acid Number | 15 | 15 | 16 | 16 | 16 | 47 |
| Brookfield Thermosel Viscosity, cP$^a$ |  |  |  |  |  |  |
| at 125° C. (257° F.) | 900 | 350 | 250 | 250 | 350 | $b$ |
| at 150° C. (302° F.) | — | — | — | — | — | $b$ |
| at 190° C. (374° F.) | — | — | — | — | — | 400 |
| Molecular Wt., approx. | 3,000 | 2,200 | 2,300 | 1,800 | 3,400 | 4,500 |

$^a$Conventional Brookfield viscosity = ~1.15 × Brookfield Thermosel viscosity.
$^b$Solid at this temperature

|  | N-10 | N-11 | N-12 | N-14 | N-15 | N-34 | C-10 | C-13 | C-15 | C-16 | C-18 |
|---|---|---|---|---|---|---|---|---|---|---|---|
| Density at 25° C., g/cm$^3$ | 0.925 | 0.921 | 0.938 | 0.920 | 0.860 | 0.910 | 0.906 | 0.913 | 0.906 | 0.908 | 0.905 |
| Acid Number | <0.05 | <0.05 | <0.05 | <0.05 | <0.05 | <0.05 | <0.05 | <0.05 | <0.05 | 5$^a$ | 5$^a$ |
| Brookfield Thermosel Viscosity$^b$, cP |  |  |  |  |  |  |  |  |  |  |  |
| at 125° C. (257° F.) | 1500 | 350 | 450 | 150 | $d$ | 450 | — | — | — | — | — |
| at 150° C. (302° F.) | — | — | — | — | $d$ | — | 7800 | — | 3900 | 8500 | 4000 |
| at 190° C. (374° F.) | — | — | — | — | 600 | — | — | — | — | — | — |
| Melt Index (at 190° C.) | — | — | — | — | — | — | 2250 | 200 | 4200 | 1700 | 4200 |
| Molecular Weight | 3000 | 2200 | 2300 | 1800 | 11000 | 2900 | 8000 | 12000 | 4000 | 8000 | 4000 |

$^a$Saponification number
$^b$Conventional Brookfield viscosity = ~1.15 × Brookfield Thermosel viscosity
$^c$2% in 130° F. paraffin
$^d$Solid at this temperature The compositions of this invention may be made by blending the components in the melt in a sigma-blade mixer, such as the Brabender, by compounding in an extruder with a mixing screw, by milling on two-roll mills, and in other mixing devices suitable for mixing polymer melts of high viscosity. The additives may also be added directly to the copolyester during manufacture before pelletizing the product.

The following examples are submitted for a better understanding of the invention.

In the examples, the beginning of crystallization is when the composition begins to turn hazy. When the composition becomes opaque, it indicates that the material has crystallized sufficiently to be non-blocking under normal drying conditions.

EXAMPLE 1

A linear, thermoplastic copolyester composed of terephthalic acid, ethylene glycol (63 mol %), and diethylene glycol (37 mol %), which has Tm=177° C., heat of fusion of 1.7 cal/g (first cycle), Tg=58° C., and I.V=0.74 dL/g, is prepared by conventional polyesterification methods (see U.S. Pat. No. 4,352,925). The copolyester is dried in an oven at 50° C. overnight under vacuum with a nitrogen sweep. An amount (59.88 g) of the copolyester is melted with 0.12 g of low-density polyethylene (MV=9400 cP @150° C., density=0.906 g/cc, Tm=99° C.) in a Brabender sigma-blade mixer at 225° C. under nitrogen. When the contents are melted, the polymers are mixed for two minutes still under a nitrogen blanket. The blend is discharged from the mixer and is cooled to room temperature. The blend appears to be clear. The blend has a melting point by DSC of 181° C., a Tg of 58° C., and a second-cycle heat of fusion of 1.2 cal/g. By contrast, the starting copolyester has no second-cycle heat of fusion. This example illustrates that inclusion of only 0.2 wt % of low-viscosity, low-density polyethylene in a slowly-crystallizing copolyester enables crystallization of the copolyester to be rapid enough for appearance of a second-cycle heat of fusion to be measured. Also a small amount (0.5 g) of the blend is placed in boiling water and is observed as the water is boiled. After 2.0 minutes, the granules of the blend are observed to turn hazy (start of crystallization) and after 5.0 minutes the granules are opaque. In a similar experiment, granules of the starting copolyester are boiled in water. The pellets begin to turn hazy after about 6.5 minutes in boiling water and are less than completely opaque after 20 minutes. This experiment shows that inclusion of only 0.2 wt % of low-viscosity, low-density polyethylene to the linear copolyester enables the copolyester to crystallize in boiling water significantly faster and to a greater extent than the unmodified polymer.

EXAMPLE 2

A blend of the copolyester of Example 1 is made with 0.02 wt % of an oxidized, low-viscosity, low-density polyethylene (d=0.942 g/cc, Tm=100° C., acid number 15, MV=1200 cP at 125° C.) by the method of, and under the same conditions as, Example 1. The resulting blend, when heated in 95° C. water, begins to crystallize in 2.5 minutes and is opaque after 5 min. The unmodified control, under similar conditions, turns hazy in 6.5 min and requires more than 20 min to turn opaque. After melting and quenching a sample in a DSC instrument, the blend crystallized on heating and has a heat of fusion of 2.1 cal/g, compared to no heat of fusion or melting point for the control similarly treated. Similar good results are obtained in blends of copolyester I made with 0.2 wt % of another low-viscosity, low-molecular-weight polyethylene (d=0.925 g/cc, Tm=106° C., MV=1500 cP at 125° C.) and also with a similar amount of low-viscosity, low-molecular-weight polypropylene (d=0.920 g/cc, Tm=160° C., MV=600 cP at 125° C.).

EXAMPLE 3

A blend of the copolyester of Example 1 is made with an emulsifiable, high-density polyethylene, (Tm=114° C., d=0.964 g/cc, acid number 16, MV=160 cP at 150° C.) by the method of Example 1. The blend has a haze formation time of 1.0 min (6.5 min for the control) and opacity time of 3.0 min (>20 min for the control). The blend has a first cycle heat of fusion of 3.3 cal/g (control: 1.7 cal/g) and second cycle heat of fusion of 2.3 cal/g (control: none). Similar good results are obtained with a nonemulsifiable, low-molecular-weight, high-density polyethylene (Tm=118° C., d=0.947 g/cc, MV=450 cP at 125° C., acid number <0.05) in blends made under the same conditions with this copolyester.

EXAMPLE 4

A blend of the copolyester of Example 1 with maleated low-molecular-weight polypropylene (Tm=161° C., d=0.934 g/cc, acid number=47, MV=370 cP at 175° C.) is prepared by the method of and under the conditions of Example 1. Times for haze formation and reaching opacity in boiling water are 2.0 and 7.0 min, respectively (6.5 and >20 min, respectively, for the control).

EXAMPLE 5

The copolyester of Example 1 is melt blended in a Brabender sigma-blade mixer with 0.2 wt % of a maleated, low-molecular-weight polyethylene. This polyethylene has a melt viscosity of 12,000 cP at 150° C., a density of 0.908 g/cc, a Tm of 100° C., and a saponification number of 5. When the blend is heated in boiling water, it turns hazy in 1.0 min and opaque in 2.5 min, compared to 6.5 and >20 min for the unblended copolyester control. This example illustrates the utility of an ethylene-based graft polymer as a crystallization aid for a slow-crystallizing copolyester.

EXAMPLE 6

A linear, thermoplasatic copolyester (59.88 g) composed of 70 mol % terephthalic acid, 30 mol % glutaric acid, 55 mol % 1,4-butanediol, and 45 mol % diethylene glycol (polyester II), having an I.V. of 0.85 dL/g, a Tm of 110° C., and a heat of fusion of 3 cal/g, is mixed with 0.12 g of the low-density polyethylene of Example 1. The polymers are melted in a Brabender sigma-blade mixer at 225° C. under a nitrogen blanket and are mixed for two min. The blend is extruded into 50° C. water. The extrudate turns hazy in 1.0 min and is opaque in 2.25 min. After 2 min treatment, the extrudate can be compressed without sticking to itself. If the unmodified copolyester II is extruded into 50° C. water, the extrudate turns hazy after 2.5 min and is opaque only after 9.0 min. If this unmodified extrudate is compressed after 2 min treatment, the strands stick together.

EXAMPLE 7

A copolyester prepared by conventional polycondensation techniques consists of 100 mol % of terephthalic acid, 69 mol % of ethylene glycol, and 31 mol % of 1,4-cyclohexanedimethanol (copolyester III). This copolyester has a Tg of 80° C. and has no crystal line melting point or other DSC features. When this polymer is boiled in water, no haze develops in an hour of boiling. When copolyester III is blended with 0.2 wt % of the additive of Example 2, and the resulting blend is boiled in water, haze develops in one minute and the polymer is opaque in about 20 minutes. This example illustrates that addition of only 0.2 wt % of an oxidized, low-viscosity polyethylene can allow a normally non-crystallizing copolyester to be crystallized with mild thermal treatment.

EXAMPLE 8

The copolyester of Example 1 (59.88 g) is mixed with 0.12 g of ethylene-vinyl acetate copolymer (28 wt % vinyl acetate, MI=140 g/10 min) in a Brabender sigma-blade mixer at the conditions of Example 1. The blend is evaluated in a DSC instrument and is found to have only a weak second cycle heat of fusion of 0.4 cal/g at 20° C./min heating rate. This amount of crystallization is insufficient to prevent blocking in pellets of the blend when they are dried at normal conditions. This composition represents an inoperable species.

EXAMPLE 9

A blend of copolyester II with 0.1 wt % of rutile titanium dioxide, a known nucleating agent for polyesters such as poly(ethylene terephthalate), is prepared in a Brabender sigma-blade mixer at 175° C. for 5 min under nitrogen. The blend is placed in 50° C. water to be crystallized alongside a control of the same copolyester without the titanium dioxide added. The two copolyesters turn hazy at about the same rate, haze being first noticeable after 2.5 min and full opacity was observed after 9 min. This example illustrates that a known nucleating agent for some high-melting polyesters does not nucleate this low-melting, low-crystallinity copolyester. Similar lack of improvement in crystallization rate is found when anatase titanium dioxide and antimony trioxide are used in place of rutile titanium dioxide in this example.

EXAMPLE 10

A blend of copolyester III (59.88 g) and high-molecular-weight, linear, low-density polyethylene (MI=0.79 g/10 min, d=0.921 g/cc, Tm=125° C.) (0.12 g) is prepared in a Brabender sigma-blade mixer under the conditions of Example 1. The blend is evaluated in a DSC instrument and is found, like the unmodified copolyester III, to have no crystallinity on either first or second cycle. This example illustrates the inefficacy of a high- MW polyethylene to provide the desired improvement in crystallization rate in a copolyester of this invention.

The "heat of fusion" $\Delta H_f$ of polymers is the amount of heat absorbed when crystallizable polymers are melted. $\Delta H_f$ values are readily obtained using Differential Scanning Calorimeters (Perkin-Elmer). For example, one method for determining $\Delta H_f$ is described in Journal of Applied Polymer Science 20, 1209 (1976). Measurement of $\Delta H_f$ is also described in Du Pont Thermal Analysis Bulletin No. 900-8 (1965). Qualitatively it is possible to compare the degree of crystallinity of polymers by comparing their $\Delta H_f$ values.

Unless otherwise specified, all parts, percentages, ratios, etc., are by weight.

The invention has been described in detail with particular reference to preferred embodiments thereof, but it will be understood that variations and modifications can be effected within the spirit and scope of the invention.

We claim:

1. Composition comprising
(a) a copolyester derived from 100 mole % of a dibasic acid component comprising about 40–100 mol % terephthalic acid and 100 mol % of a glycol component comprising about 40–100 mol % ethylene glycol, 1,4-butanediol or 1,6-hexanediol, wherein about 20–120 mol %, based on 200 mol % polymer, is derived from about
   (1) 0 to about 60 mol % of a second acid selected from the group consisting of isophthalic acid, dimer acid and aliphatic dicarboxylic acids having 3–12 carbon atoms,
   (2) 0 to about 60 mole % of a second glycol having 2–10 carbon atoms, or
   (3) about 20–120 mole % of a combination of said second acid and second glycol,
said copolyester characterized by having a melting temperature of about 80°–190° C. and a $\Delta H_f$ of less than about 6 cal/gm, and
(b) about 0.02 to about 2 wt % of at least one natural or synthetic wax with said natural wax being animal, vegetable, or mineral waxes with melting points in the range of about 40° to about 90° C. and melt viscosities in the range of about 5 to about 100 cp at 125° C.; said synthetic waxes being based on polyethylene, polypropylene, poly-1-butene, ethylene or propylene copolymers with each other, or with α-olefins containing 3–6 carbon atoms, or Fischer Tropsch waxes, with melting points in the range of about 95° C. to 160° C., densities of about 0.90 to about 0.965 and melt viscosities ranging from about 5 cp. to about 30,000 cp. at 190° C.

2. A composition according to claim 1 wherein said copolyester is derived from essentially 100 mol % terephthalic acid.

3. A composition according to claim 1 wherein said copolyester is derived from terephthalic acid and isophthalic acid.

4. A composition according to claim 1 wherein said copolyester is derived from terephthalic acid and at least one aliphatic dicarboxylic acid having 3–12 carbon atoms.

5. A composition according to claim 1 wherein said wax is a natural wax.

6. A composition according to claim 1 wherein said wax is a synthetic wax.

7. An adhesive comprising the composition of claim 1.

8. A film or sheet material comprising the composition of claim 1.

9. A particulate material comprising the composition of claim 1.

* * * * *